US006970035B2

(12) United States Patent
Tanimoto

(10) Patent No.: US 6,970,035 B2
(45) Date of Patent: Nov. 29, 2005

(54) CHARGE PUMP CIRCUIT

(75) Inventor: Takashi Tanimoto, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/776,011

(22) Filed: Feb. 2, 2001

(65) Prior Publication Data
US 2001/0011919 A1 Aug. 9, 2001

(30) Foreign Application Priority Data

Feb. 4, 2000 (JP) .............................. 2000-026895
Oct. 31, 2000 (JP) .............................. 2000-331879

(51) Int. Cl.[7] .............................. G05F 1/10; G05F 3/02
(52) U.S. Cl. .................................................... 327/536
(58) Field of Search ............................... 327/536, 537, 327/589, 390; 363/59–60; 307/109, 110

(56) References Cited

U.S. PATENT DOCUMENTS 5,339,236 A * 8/1994 Tamagawa .................... 363/59
5,790,393 A * 8/1998 Fotouhi ........................ 363/60
6,046,626 A * 4/2000 Saeki et al. .................. 327/536
6,107,862 A * 8/2000 Mukainakano et al. ..... 327/536
6,169,444 B1 * 1/2001 Thurber, Jr. ................. 327/536

FOREIGN PATENT DOCUMENTS

JP 09-282878 10/1997
JP 10-215563 8/1998
JP 2000-331879 11/2000

* cited by examiner

Primary Examiner—Quan Tra
(74) Attorney, Agent, or Firm—Sheridan Ross P.C.

(57) ABSTRACT

A charge pump circuit for converting an input voltage to a predetermined voltage. The charge pump circuit includes switching transistors, which are connected in series between an output terminal and reference potential terminal of the charge pump circuit, and a capacitor connected to a node between the first and second transistors. The switching transistors include a first transistor connected to the reference potential terminal and a second transistor connected to the first transistor. The capacitor has a first terminal connected to a node between the transistors and a second terminal connected to a delay circuit. The delay circuit is connected between the second terminal of the capacitor and a control terminal of the first transistor. The delay circuit delays a clock signal received by the control terminal by a predetermined time and provides the delayed first clock signal to the second terminal of the capacitor.

10 Claims, 8 Drawing Sheets

CHARGE PUMP CIRCUIT

BACKGROUND OF THE INVENTION

The present invention relates to a charge pump circuit, and more particularly, to a charge pump for converting a voltage with a capacitor.

FIG. 1A is a schematic circuit diagram of a first example of a prior art charge pump circuit 501, and FIG. 1B is a schematic circuit diagram of a second example of a prior art charge pump circuit 502. The charge pump circuit 501 includes two diodes D1, D2, a capacitor C1, and an output capacitor Cout. The charge pump circuit 502 includes p-channel MOS transistors T1, T2 in lieu of the diodes D1, D2.

A clock signal CLK is provided via the capacitor C1 to a node N1 between the diodes D1, D2 of the charge pump circuit 501 or between the transistors T1, T2 of the charge pump circuit 502. The charge pump circuits 501, 502 each convert a power supply voltage VDD, the value of which is a high logic level of the clock signal CLK, to a negative voltage "−VDD".

FIG. 2 is a combined timing and waveform chart illustrating the operation of the charge pump circuits 501, 502.

In FIG. 2, prior to time t1, the clock signal CLK is high, and the diode D1 (transistor TR1) is activated. In this state, the voltage Vn1 at node N1 is substantially equal to zero volts (ground voltage GND), and the output voltage Vout is also substantially equal to the ground voltage GND.

When the clock signal CLK falls to a logic low level (zero volts) at time t1, the capacitor C1 decreases the node voltage Vn1 to substantially −VDD. In this state, the diode D1 (transistor TR1) is deactivated, and the diode D2 (transistor TR2) is activated. Thus, the output voltage Vout becomes equal to substantially −VDD, as shown in FIG. 2. This charges the output capacitor Cout to −VDD.

When the clock signal CLK goes high again at time t2, the capacitor C1 substantially increases the node voltage Vn1 to the ground voltage GND. This deactivates the diode D2 (transistor TR2) and holds the output voltage Vout at the vicinity of the charge voltage −VDD of the output capacitor Cout.

Then, when the clock signal CLK goes low again at time t3, the node voltage Vn1 decreases again to substantially −VDD. In this state, the diode D1 (transistor TR1) is deactivated, and the diode D2 (transistor TR2) is activated. Thus, the output capacitor Cout is charged to −VDD. The repeated charging of the output capacitor Cout holds the output voltage Vout at substantially −VDD.

Except for the externally connected capacitors C1, Cout, an integrated circuit (IC) may be configured from the charge pump circuits 501, 502. Accordingly, the charge pump circuits 501, 502 are used in an IC as a voltage conversion circuit for obtaining a desired voltage value. For example, the charge pump circuits 501, 502 are used in a charge-coupled device (CCD) driver IC or a memory IC.

The charge pump circuits 501, 502 enable step-up and step-down of a voltage with a simple circuit configuration. However, voltage decreases resulting from a threshold voltage value Vth of the diodes D1, D2 (or the transistors T1, T2) may decrease the absolute value of the output voltage Vout. In the charge pump circuits 501, 502, the absolute logic value of the output voltage Vout is VDD−2Vth and decreased from the maximum logic value VDD by 2Vth. The decrease in the absolute value of the output voltage Vout decreases the voltage conversion efficiency of the charge pump circuit.

To avoid the decrease of the output voltage (absolute value) that is caused by the threshold value Vth, for example, instead of forming a diode connection with the transistors T1, T2, the p-channel MOS transistors T1, T2 of FIG. 1B may be used in the conventional manner. In this case, the through current generated when controlling the activation and deactivation of the transistors T1, T2 decreases voltage conversion efficient and lowers transistor reliability.

SUMMARY OF THE INVENTION

It is an object of the present invention to provide a charge pump circuit that increases the voltage conversion efficiency while guaranteeing high reliability.

To achieve the above object, the present invention provides a charge pump circuit including a plurality of switching transistors connected in series between an output terminal and reference potential terminal of the charge pump circuit. The plurality of switching transistors includes a first transistor connected to the reference potential terminal and a second transistor connected to the first transistor. The first transistor has a control terminal provided with a first clock signal, and the second transistor has a control terminal provided with a second clock signal. The first and second clock signals have inverted phases. A capacitor as connected to a node between the first and second transistors and has a first terminal and a second terminal. A delay circuit is connected between the second terminal of the capacitor and the control terminal of the first transistor. The delay circuit delays the first clock signal by a predetermined time and provides the delayed first clock signal to the second terminal of the capacitor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1A:
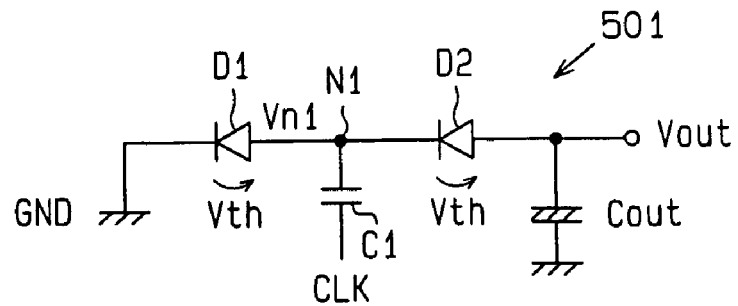
FIG. 1A is a schematic circuit diagram of a first example of a prior art charge pump circuit.
Figure 1B:
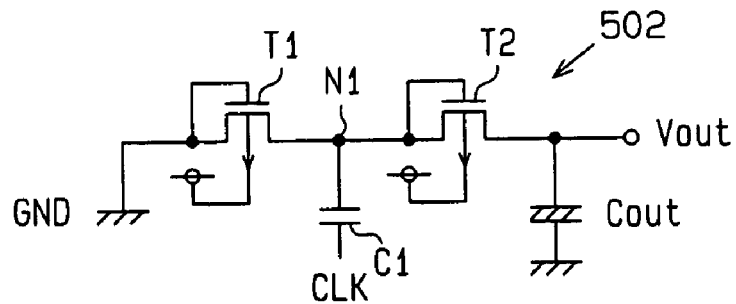
FIG. 1B is a schematic circuit diagram of a second example of a prior art charge pump circuit.
Figure 2:
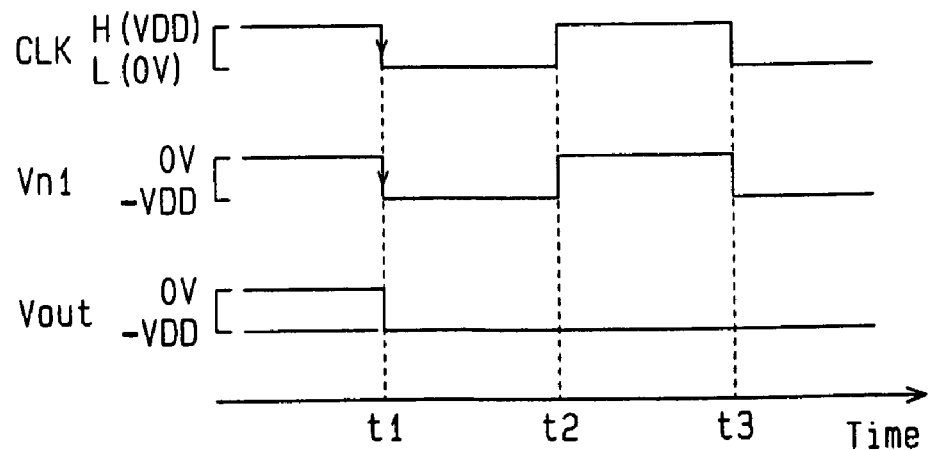
FIG. 2 is a combined timing and waveform chart illustrating the operations of the charge pump circuits of FIGS. 1A and 1B.

In the drawings, like numerals are used for like elements throughout.

[First Embodiment]

Figure 3:
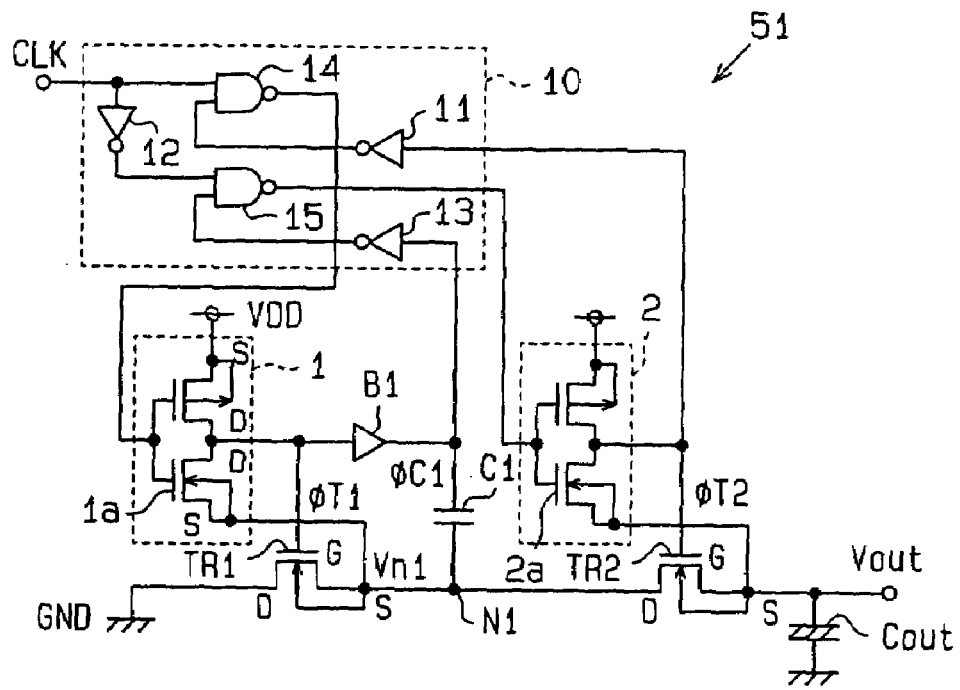
FIG. 3 is a schematic circuit diagram of a charge pump circuit according to a first embodiment of the present invention.

FIG. 3 is a schematic circuit diagram of a charge pump circuit 51 according to a first embodiment of the present invention. The charge pump circuit 51 converts a power supply voltage VDD to −VDD (logic value), which is a negative voltage, and includes two switching transistors TR1, TR2, which are preferably n-channel MOS transistors, a capacitor C1, and an output capacitor Cout, The sources S and drains D of the switching transistors TR1, TR2 are inverted in accordance with the operational status of the transistors TR1, TR2.

The charge pump circuit 51 further includes a timing adjustment circuit 10, CMOS inverters 1, 2, and a buffer circuit B1, which serves as a delay circuit.

The timing adjustment circuit 10 includes inverters 11, 12, 13 and NAND circuits 14, 15. The timing adjustment circuit 10 receives a clock signal CLK. Based on the clock signal CLK, the timing adjustment circuit 10 generates control clock signals ØT1, ØT2, which respectively activate and deactivate the switching transistors TR1, TR2, and adjusts the activation and deactivation timing of the switching transistors TR1, TR2.

The source S of an n-channel MOS transistor 1a of the CMOS inverter (buffer circuit) 1 is connected to the source S of the switching transistor TR1. A source S of an n-channel MOS transistor 2a of the CMOS inverter (buffer circuit) 2 is connected to a source S of the switching transistor TR2. Due to such connection, when the voltage at the sources of the switching transistors TR1, TR2 become negative, the low voltage value of the control clock signals ØT1, ØT2 become negative and the deactivation of the transistors TR1, TR2 is ensured.

The buffer circuit (delay circuit) B1 is connected between the output terminal of the CMOS inverter 1 and the capacitor C1. The buffer circuit B1 converts the signal level of the control clock signal ØT1 and delays the clock signal ØT1 by a predetermined time to generate a capacitor clock signal ØC1. The capacitor clock signal ØC1 is provided to the capacitor C1. The buffer circuit B1 is configured by, for example, a plurality of CMOS inverters (not shown).

In the charge pump circuit 51, after the control clock signal ØT1 is applied to the gate of the switching transistor TR1, the capacitor clock signal ØC1 is provided to the capacitor C1 thereby changing the source voltage (voltage at node N1) Vn1 of the transistor TRI.

Thus, when the switching transistor TR1 is activated, the activation of a parasitic transistor of the transistor TR1 in a semiconductor substrate is prevented. Further, when the transistor TR1 is deactivated, fluctuation of the node voltage Vn1, which is caused by the transistor TR1, is prevented.

Figure 4:
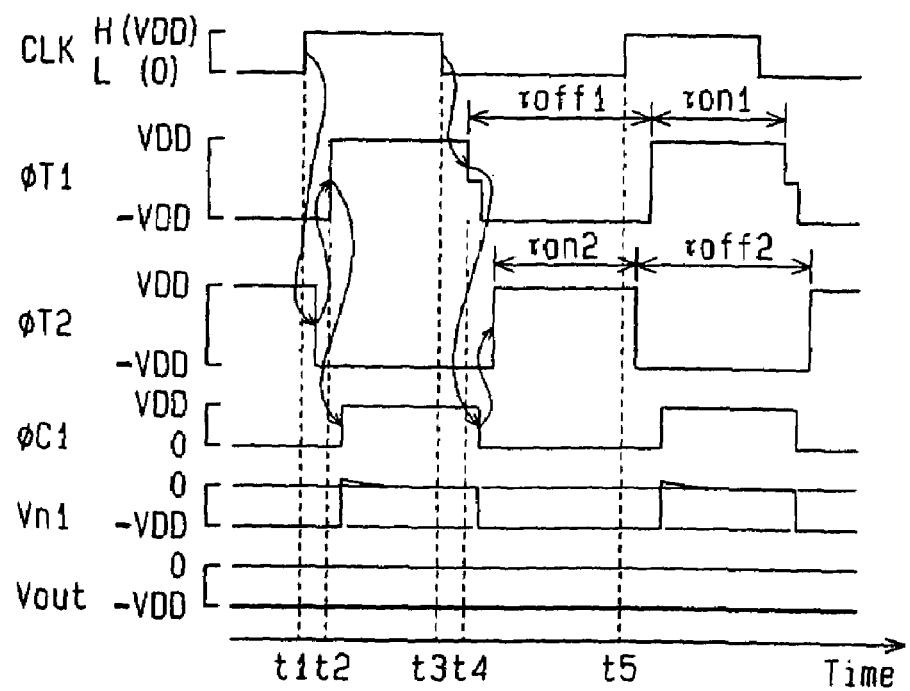
FIG. 4 is a combined timing and waveform chart of the charge pump circuit of FIG. 3.

The generation of the negative voltage of the charge pump circuit 51 will now be described. FIG. 4 is a combined timing and waveform chart illustrating the operation of the charge pump circuit 51. FIG. 4 illustrates normal operation of the charge pump circuit 51 and does not illustrate transitional operations performed when activating the charge pump circuit 51.

At time t1 in FIG. 4, the clock signal CLK goes high (VDD) This causes the output signal of the inverter 12 to go low (zero volts) and the output signal of the NAND circuit 15 to go high. The output signal of the NAND circuit 15 is provided to the input terminal of the CMOS inverter 2, and the inverter 2 outputs the control clock signal ØT2 at a low level (−VDD).

In this state, the switching transistor TR2 goes off, the output signal of the inverter 11 goes high, and the output signal of the NAND circuit 14 goes low (zero volts). The output signal of the NAND circuit 14 is provided to the input terminal of the CMOS inverter 1. At time t2 in FIG. 4, the inverter 1 outputs the control clock signal ØT1 at a high level (VDD). When a predetermined delay time, which is determined by the buffer circuit B1, elapses from time t2, the capacitor clock signal ØC1 shifts to the high level (VDD). This increases the node voltage Vn1 from −VDD until it becomes substantially zero volts.

At time t3, the clock signal CLK goes low (zero volts). This causes the output signal of the NAND circuit 14 to go high. The high output signal is provided to the CMOS inverter 1. At time t4 in FIG. 4, the inverter 1 outputs the control clock signal ØT1 at the low level (−VDD), and the switching transistor TR1 goes off.

After the predetermined delay time determined by the buffer circuit B1 elapses from time t4, the capacitor clock signal ØC1 shifts to the low level (zero volts). In this state, the output signal of the inverter 13 shifts to the high level (VDD) and causes the output signal of the NAND circuit 15 to go low (zero volts). The output signal of the NAND circuit 15 is provided to the CMOS inverter 2, and the inverter 2 outputs the control clock signal ØT2 at the high level (VDD) The switching transistor TR2 goes on, Afterward, when the clock signal CLK goes high again at time t5, operations are performed in the same manner as at time t1.

In the charge pump circuit 51, by repeating the above operations, the influence of the threshold voltage Vth of the switching transistors TR1, TR2 is eliminated, and the output voltage Vout that is close to the logic value −VDD is obtained.

In the charge pump circuit 51, the switching transistors TR1, TR2 do not go on simultaneously. That is, referring to FIG. 4, an activation time period τon2 of the switching transistor TR2 is set during a deactivation time period τoff1 of the switching transistor TR1. An activation time period τon1 of the switching transistor TR1 is set during a deactivation time period τoff2 of the switching transistor TR2 Thus, the desired output voltage Vout is efficiently obtained, and a large through current is prevented from being generated in the transistors TR1, TR2. This increases the reliability of the charge pump circuit.

The advantages of the charge pump circuit 51 of the first embodiment will now be discussed.

(1) The source voltage (voltage at node N1) Vn1 of the transistor TR1 changes after the gate voltage of the switching transistor TR1 is determined. This avoids the influence of parasitic transistor during switching of the switching transistor TR1 and prevents fluctuations of the node voltage Vn1. As a result, the operation of the charge pump circuit is guaranteed, and the reliability of the charge pump circuit is increased.

(2) The sources S of the n-channel MOS transistors of the CMOS inverters 1, 2 are respectively connected to the sources 3 of the switching transistors TR1, TR2. Thus, the gate voltages (control clock signals ØT1, ØT2) for ensuring the deactivation of the transistors TR1, TR2 are obtained through a simple circuit configuration.

(3) The timing adjustment circuit 10 generates control clock signals ØT1, ØT2, which prevent the switching transistors TR1, TR2 from being activated simultaneously. This prevents a large through current from flowing through the transistors TR1, TR2. As a result, the reliability of the transistors TR1, TR2 increases, and power consumption of the charge pump circuits decreases.

(4) The threshold voltage Vth of the switching transistors TR1, TR2 does not affect voltage conversion. Thus, the voltage conversion obtains a high voltage value (absolute value).

[Second Embodiment]

A charge pump circuit 52 according to a second embodiment of the present invention will now be described centering on parts differing from the charge pump circuit 51 of the first embodiment.

Figure 5:
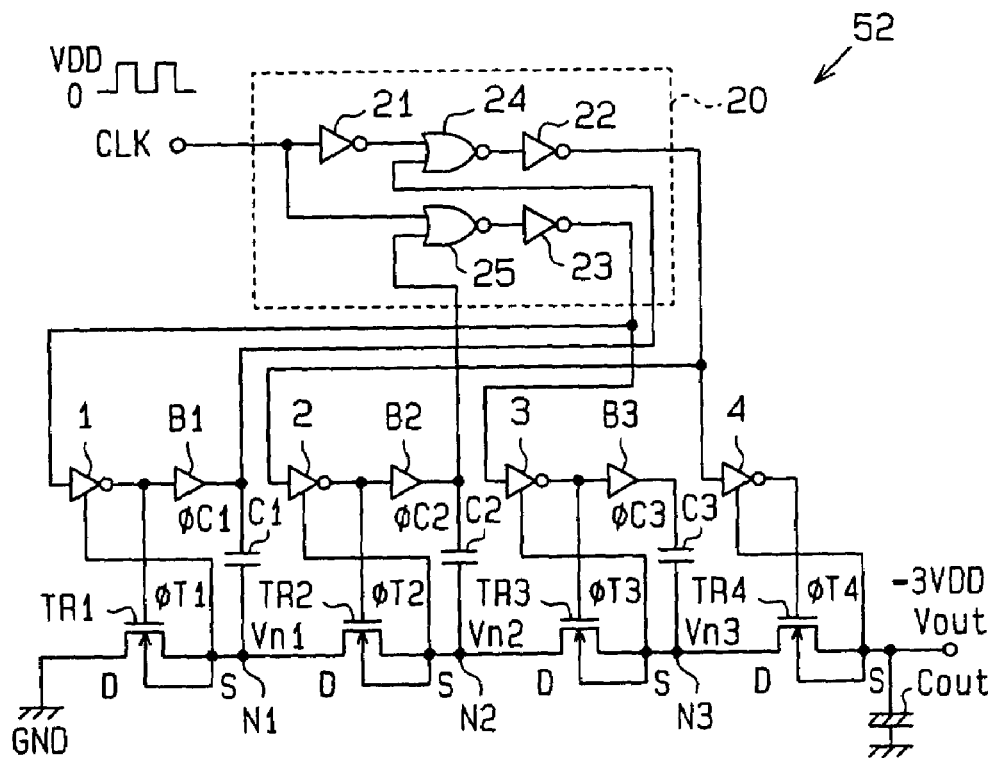
FIG. 5 is a schematic circuit diagram of a charge pump circuit according to a second embodiment of the present invention.

FIG. 5 is a schematic circuit diagram of the charge pump circuit 52 of the second embodiment. The charge pump circuit 52 has a timing adjustment circuit 20 that differs from the timing adjustment circuit 10 of the charge pump circuit 51 of the first embodiment. The charge pump circuit 52 includes four switching transistors TR1, TR2, TR3, TR4 and three capacitors C1, C2, C3 and converts the power supply voltage VDD to negative voltage −3VDD (logic value). The sources S and drains D of the switching transistors TR1, TR2, TR3, TR4 are inverted in accordance with the operational conditions of the transistors TR1, TR2, TR3, TR4.

The timing adjustment circuit 20 includes three inverters 21, 22, 23 and two NOR circuits 24, 25. The timing adjustment circuit 20 adjusts the timing of clock signals, which have inverted phases, so that the clock signals do not simultaneously activate two switching transistors.

CMOS inverters 1, 2, 3, buffer circuits B1, B2, B3, and capacitors C1, C2, C3 are connected to the switching transistors TR1, TR2, TR3, respectively. A CMOS inverter 4 is connected to the switching transistor TR4. In the charge pump circuit 52 of the second embodiment, the control clock signals ØT1, ØT3 are the same signal, the control clock signals ØT2, ØT4 are the same signal, and the capacitor clock signals ØC1, ØC3 are the same signal.

Figure 6:
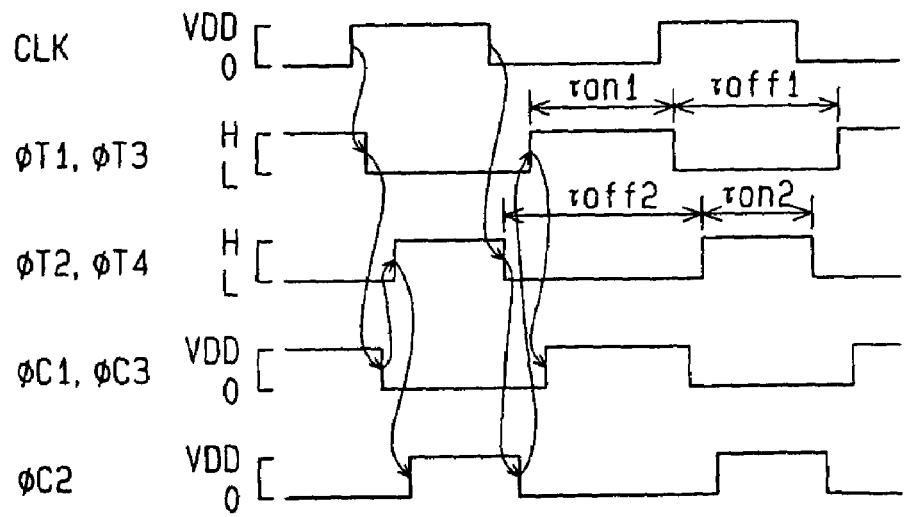
FIG. 6 is a combined timing and waveform chart of the charge pump circuit of FIG. 5.

The negative voltage generation operation of the charge pump circuit 52 will now be discussed. FIG. 6 is a combined timing and waveform diagram illustrating the operation of the charge pump circuit 52.

The buffer circuits B1, B3 delay the control clock signals ØT1, ØT3 to generate the capacitor clock signals ØC1, ØC3, respectively. The buffer circuit B2 delays the control clock signals ØT2 to generate the capacitor clock signal ØC2.

The set of the control clock signals ØT1, ØT3 and the set of the Control clock signals ØT2, ØT4 are generated so that when one set is low (the corresponding transistors being deactivated), the other set is high (the corresponding transistors being activated). That is, referring to FIG. 6, the activation time period τon1 of the switching transistors TR1, TR3 is set during the deactivation time period τoff2 of the switching transistor TR2, TR4. The activation time period τon2 of the switching transistors TR2, TR4 is set during the deactivation time period τoff1 of the switching transistor TR1, TR3.

Figure 7:
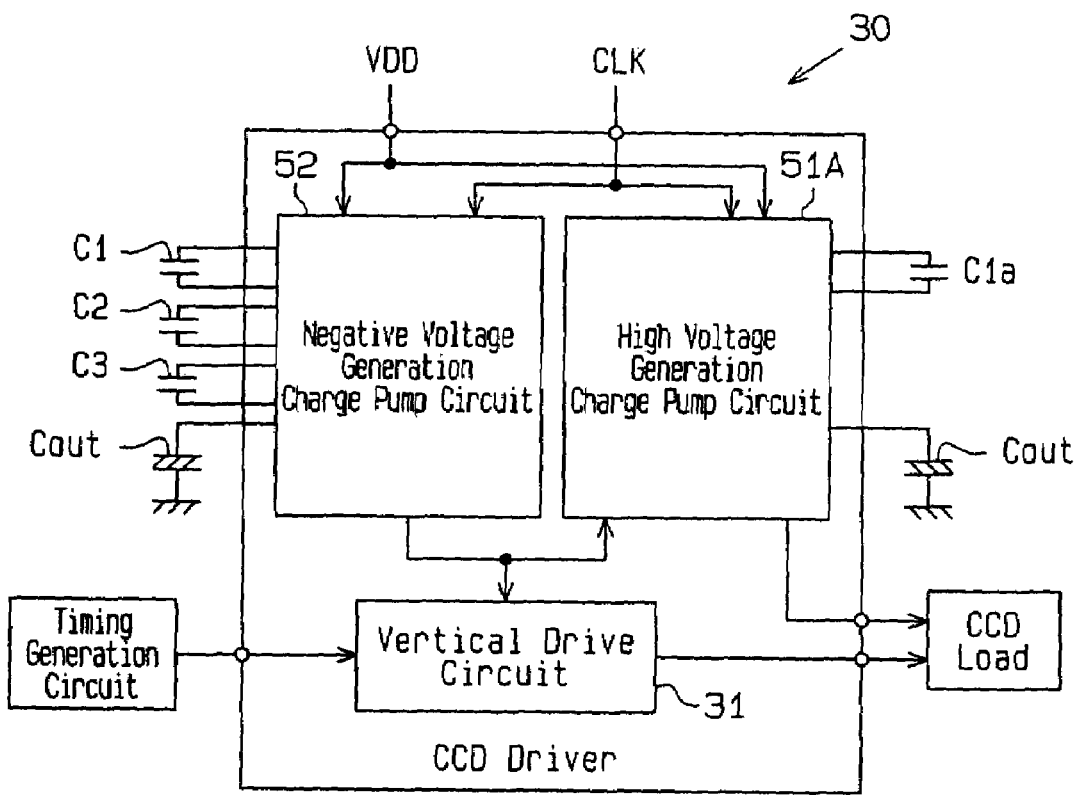
FIG. 7 is a schematic block diagram of a CCD driver incorporating the charge pump circuits of FIGS. 3 and 5.

An example in which the charge pump circuits 51, 52 of the first and second embodiments 51, 52 are applied to, for example, a CCD driver 30, which is an integrated circuit (IC), will now be discussed. FIG. 7 is a schematic block diagram of the CCD driver 30.

The CCD driver 30 drives a frame transfer CCD (not shown). More specifically, the CCD driver 30 synchronously transfers the charge generated at the imaging portion of the CCD to perform vertical transfer drive of charges.

Referring to FIG. 7, the CCD driver 30 includes a high voltage generation charge pump circuit 51A, a negative voltage generation charge pump 52, and a vertical drive circuit 31. Pumping capacitors C1, C2, C3 and an output capacitor Cout are externally connected to the driver 30.

The charge pump circuit 52 obtains substantially −3VDD as the logic value output voltage Vout. The output voltage Vout is provided to the high voltage generation charge pump circuit 51A and the vertical drive circuit 31.

The high voltage generation charge pump circuit 51A has the circuit configuration of, for example, the charge pump circuit 51. In the charge pump circuit 51A, the switching transistors TR1, TR2 are p-channel MOS transistors, and the drain of the transistor TR1 is connected to the power supply voltage VDD. The sources (power supply terminal) of the CMOS inverters 1, 2 are connected to the node N1, and the sources of the n-channel MOS transistors of the CMOS inverters 1, 2 are grounded. The clock signal CLK undergoes level conversion based on the output voltage Vout of the charge pump circuit 52.

The charge pump circuit 52 of the second embodiment has the advantages discussed below, (1) The source voltages (voltages at nodes N1, N2, N3) Vn1, Vn2, Vn3 of the transistors TR1, TR2, TR3 change after the gate voltages of the switching transistors TR1, TR2, TR3 are determined. This avoids the influence of parasitic transistor during switching of the switching transistors TR1, TR2, TR3 and prevents fluctuations of the node voltages Vn1, Vn2, Vn3. As a result, the operation of the charge pump circuit is guaranteed, and the reliability of the charge pump circuit is increased.

(2) The sources S of the n-channel MOS transistors of the CMOS inverters 1, 2, 3, 4 are respectively connected to the sources S of the switching transistors TR1, TR2, TR3, TR4. Thus, the gate voltages (control clock signals ØT1, ØT2, ØT3, ØT4) for ensuring the deactivation of the transistors TR1, TR2, TR3, TR4 are obtained through a simple circuit configuration.

(3) The timing adjustment circuit 20 generates control clock signals ØT1, ØT2, ØT3, ØT4, which prevent the switching transistors TR1, TR2, TR3, TR4 from being activated simultaneously This prevents a large through current from flowing through the transistors TR1, TR2, TR3, TR4. As a result, the reliability of the transistors TR1, TR2, TR3, TR4 increases, and power consumption of the charge pump circuits decreases.

(4) The threshold voltage Vth of the switching transistors TR1, TR2, TR3, TR4 does not affect voltage conversion. Thus, the voltage conversion obtains a high conversion voltage value (absolute value).

[Third Embodiment]

A charge pump circuit 53 according to a third embodiment of the present invention will now be described centering on parts differing from the charge pump circuit 51 of the first embodiment.

The charge pump circuit 51 of the first embodiment is provided with the buffer circuit B1, which delays the control clock signal ØT1 by a predetermined time to generate the capacitor clock ØC1. The buffer circuit 51 changes the source voltage (voltage at node N1) Vn1 after the gate voltage of the switching transistor TR1 is determined. This avoids the influence of parasitic transistor on the transistor TR1.

In this case, unnecessary current consumption may occur from when the transistor TR1 goes on to when the signal output by the buffer circuit B1 goes high. In other words, the transistor TR1 goes on thereby connecting the drain and source of the transistor TR1 This causes current to flow from the GND to node N1 and increases the potential Vn1 at the node N1. As the potential Vn1 increases, the potential at the output terminal of the buffer circuit B1 changes. However, for example, if the buffer circuit B1 is configured by two CMOS inverters, in this state, the n-channel MOS transistor in the second inverter is activated. Thus, current flows via the MOS transistor from the capacitor C1 to a power supply terminal (ground terminal) at a low level side of the MOS transistor.

In this manner, when current irrelevant to that stored in the capacitor C1 is consumed in the buffer circuit B1, the step-up conversion efficiency of the charge pump circuit decreases. Since the output signal of the buffer circuit B1 is the input signal of the capacitor C1, the drive power of the MOS transistor in the second inverter of the buffer circuit B1 is especially set to be large. Thus, the power consumption of the MOS transistor is large, and the decrease in the step-up conversion efficiency of the charge pump circuit cannot be ignored.

The buffer circuit (delay circuit) of the charge pump circuit 53 of the third embodiment is configured in the following manner. Before the control clock signal ØT1 goes high, the feed line leading to the capacitor C1 is set at a state of high impedance. After the control clock signal ØT1 goes high, the feed line is set at a high level.

Figure 8:
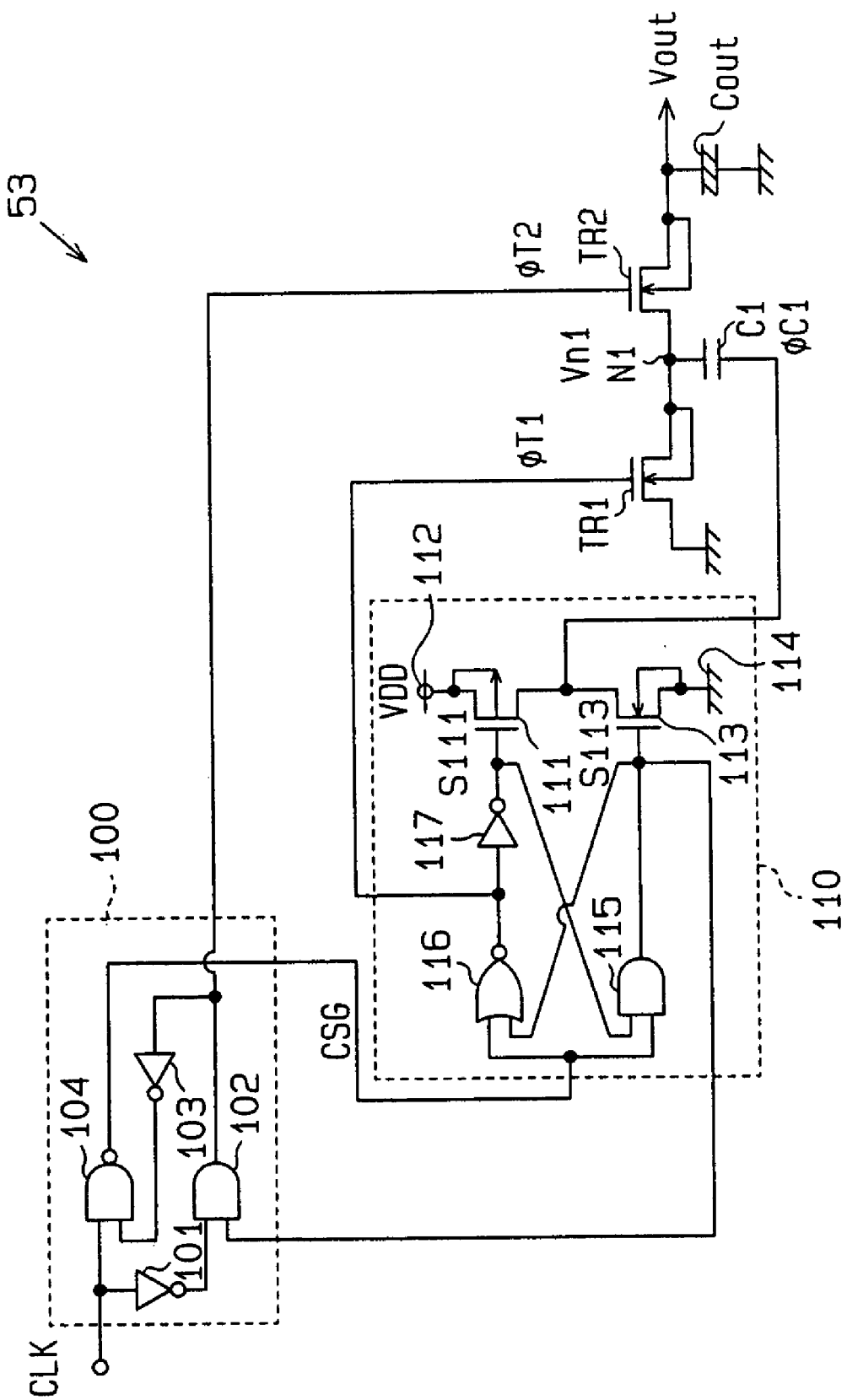
FIG. 8 is a schematic circuit diagram of a charge pump circuit according to a third embodiment of the present invention.

FIG. 8 is a schematic circuit diagram of a charge pump circuit 53 according to a third embodiment of the present invention. The charge pump circuit 53 includes a timing adjustment circuit 100 for adjusting the clock signal provided to two switching transistors TR1, TR2, a capacitor C1, an output capacitor Cout, and transistors TR1, TR2.

The charge pump circuit 53 has a buffer circuit (delay circuit) 110.

The buffer circuit 110 includes a p-channel MOS transistor 111, which controls the connection between the capacitor C1 and a power supply terminal 112 provided with the power supply voltage VDD, and an n-channel MOS transistor 113, which controls the connection between a capacitor C2 and a ground terminal 114 The buffer circuit 110 further includes an AND circuit 115, a NOR circuit 116, and an inverter 117.

After the transistor TR1 goes on and until the signal received by the capacitor C1 goes high, the buffer circuit 110 generates control signals of the transistors 111, 113 as described below to reduce power consumption.

The timing adjustment control circuit 100 provides the buffer circuit 110 with an instruction signal that causes the control clock signal ØT1 to go high. Based on the instruction signal, the buffer circuit 110 generates a deactivation control signal for deactivating the transistor 113 and causes the control clock signal ØT1 to go high based on the deactivation control signal. Further, the buffer circuit 110 generates an activation control signal for activating the transistor 111 based on the high control clock signal ØT1.

The AND circuit 115 of the buffer circuit 110 performs an AND logic operation with a control clock signal CSG, which is provided from the timing adjustment circuit 100, and a control signal S111, which is provided to the gate of the transistor 111, to generate a control signal S113. The control signal S113 is provided to the gate of the transistor 113.

A NOR circuit 116 of the buffer circuit 110 performs a NOR logic operation with the control signal CSG and the output signal of the AND circuit 115 to generate the control clock signal ØT1. The control signal ØT1 is provided to the gate of the transistor TR1. An inverter 117 of the buffer circuit 110 inverts the output signal of the NOR circuit 116 to generate the control signal S111 and provides the control signal S111 to the gate of the transistor 111.

Before the clock signal ØT1, which is provided to the gate of the transistor TR1, goes high, the buffer circuit 110 maintains the transistor 113 in a deactivated state and sets the feed line of the capacitor C1 in a high impedance state. Then, after the clock signal ØT1 goes high, the transistor 111 is activated and the feed line of the capacitor C1 is provided with a high voltage.

The timing adjustment circuit 100 receives the clock signal CLK to generate clock signals for preventing the transistors TR1, TR2 from simultaneously going on. The timing adjustment circuit 100 causes the control clock signal ØT2 to go low in accordance with the logic level of the clock signal CLK and generates the control clock signal CSG to instruct the buffer circuit 110 to generate the high control clock signal ØT1.

Further, the timing adjustment circuit 100 provides the control clock signal CSG, which instructs the buffer circuit 110 to generate the low control clock signal ØT1, to the buffer circuit 110 and generates the high control clock signal ØT2 based on the control clock signal CSG.

Referring to FIG. 8, the timing adjustment circuit 100 includes a first inverter 101, which inverts the clock signal CLK, and an AND circuit 102. The AND circuit 102 provides the gate of the transistor TR2 with an AND logic signal based on the control signal S113, which is provided to the gate of the transistor 113, and an output signal of the first inverter 101. Further, the timing adjustment circuit 100 includes a second inverter 103, which inverts the AND logic signal provided to the gate of the transistor TR2, and a NAND circuit 104. The NAND circuit 104 provides the buffer circuit 110 with the control clock signal CSG, which is a NAND logic signal based on the output signal of the second inverter 103 and the clock signal CLK. The buffer circuit 110 generates the control clock signal ØT1 based on the control clock signal CSG.

When the voltages at the sources of the transistors TR1, TR2 becomes negative, the circuit configuration of FIG. 8 does not set the value of the negative voltage as the low level voltage value of the control clock signals ØT1, ØT2. To do so, for example, low potential power supply terminals, which are supposed to be grounded, of the AND circuit 115 and the NOR circuit 116 may be connected to the sources of the transistors TR1, TR2. The operation of the charge pump circuit 53 when configured in such manner will now be described.

Figure 9:
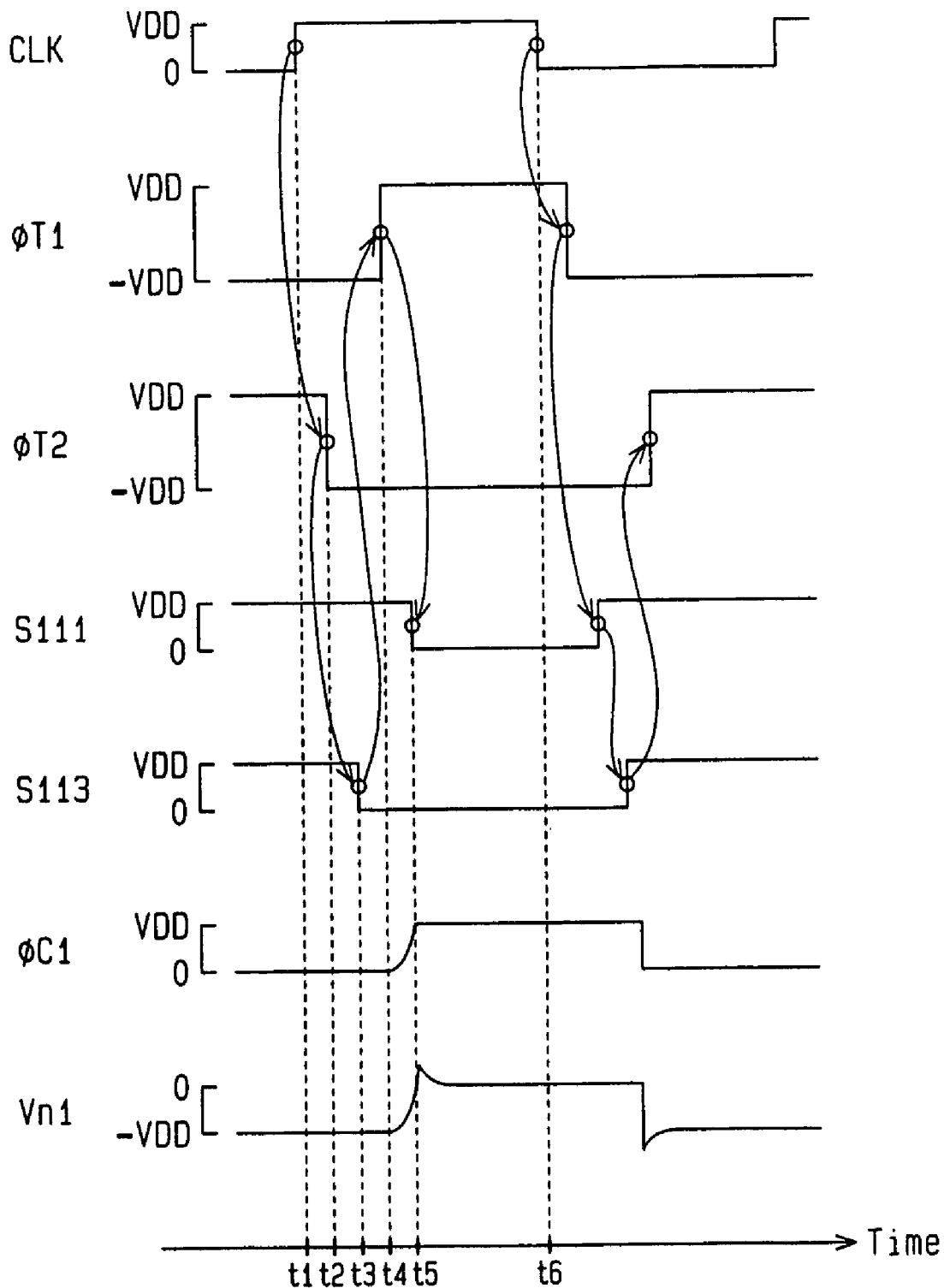
FIG. 9 is a combined timing and waveform chart illustrating the operation of the charge pump circuit of FIG. 8.

FIG. 9 is a combined timing and waveform chart illustrating the operation of the charge pump circuit 53.

At time t1 in FIG. 9, when the clock signal CLK goes high (VDD), the output signal of the first inverter 101 goes low. At time t2, the AND circuit 102 provides the gate of the transistor TR2 with the control clock signal ØT2 at the low level (−VDD). This deactivates the transistor TR2.

The second inverter 103 inverts the control clock signal ØT2 and provides the inverted clock signal to a first input terminal of the NAND circuit 104. The clock signal CLK received by a second input terminal of the NAND circuit 104 goes high. In this state, the NAND circuit 104 provides the buffer circuit 110 with the control clock signal CSG at a low level.

A first input terminal of the AND circuit 115 of the buffer circuit 110 receives the low control clock signal CSG. At time t3 in FIG. 9, the AND circuit 115 provides the gate of the transistor 113 with the control signal S113 at a low level. Further, the low control signal S113 is provided to a first input terminal of the NOR circuit 116. A second input terminal of the NOR circuit 116 receives the control clock signal CSG from the timing adjustment circuit 100. At time t4 in FIG. 9, the NOR circuit 116 provides the gate of the transistor TR1 with the high control clock signal ØT1. This activates the transistor TR1.

The transistor 113 goes off before the gate of the transistor TR1 receives the high control clock signal ØT1. This prevents the flow of unnecessary current between the capacitor C1 and the ground terminal 114 that would occur when the potential at the capacitor C1 changes due to activation of the transistor TR1.

The inverter 117 inverts the high control clock signal ØT1 and provides the gate of the transistor 111 with the control signal S111 at a low level. Thus, at time t5 in FIG. 9, the transistor 111 is activated. This fixes the potential of the capacitor C1 at a high level. Further, the potential at node N1, which starts to increase at time t4, is fixed at the ground level.

At time t6 in FIG. 9, when the clock signal CLK goes low (zero volts), the control clock signal CSG goes high. This causes the buffer circuit 110 to output the control clock signal ØT1 at a low level and deactivates the transistor TR1. Further, the inverter 117 inverts the control clock signal ØT1 and provides the gate of the transistor 111 with the high control signal S111.

A second input terminal of the AND circuit 115 receives the control signal S111. The AND circuit 115 performs an AND logic operation based on the high control signal S111 and the high control clock signal CSG and generates the control signal S113 at a high level. The AND circuit 115 provides the high control signal S113 to the gate of the transistor 113 and a second input terminal of the AND circuit 102. The AND circuit 102 performs an AND logic operation based on the high control signal S113 and the high clock signal CLK and generates the control clock signal ØT2 at a high level. The gate of the transistor TR2 receives the high control clock signal ØT2. This activates the transistor TR2, and the transistor TR2 outputs the node voltage Vn1 as the output voltage Vout.

The charge pump circuit 53 repeats such operations and maintains the step-up efficiency in an optimal manner.

The charge pump circuit 53 of the third embodiment has the advantages described below.

(1) The transistor TR1 is activated after the transistor 113 of the buffer circuit 110 is deactivated. Thus, power is not consumed between the capacitor C1 and the ground terminal 114 from when the transistor TR1 goes on to when the capacitor clock signal ØC1 goes high.

(2) The transistor 111 goes on after the transistor 113 goes off. Further, the transistor 113 goes on after the transistor 111 goes off. This prevents through current from flowing between the transistors 113, 111.

[Fourth Embodiment]

A charge pump circuit 54 according to a fourth embodiment of the present invention will now be described centering on parts differing from the charge pump circuit 52 of the second embodiment and the charge pump circuit 53 of the third embodiment.

Figure 10:
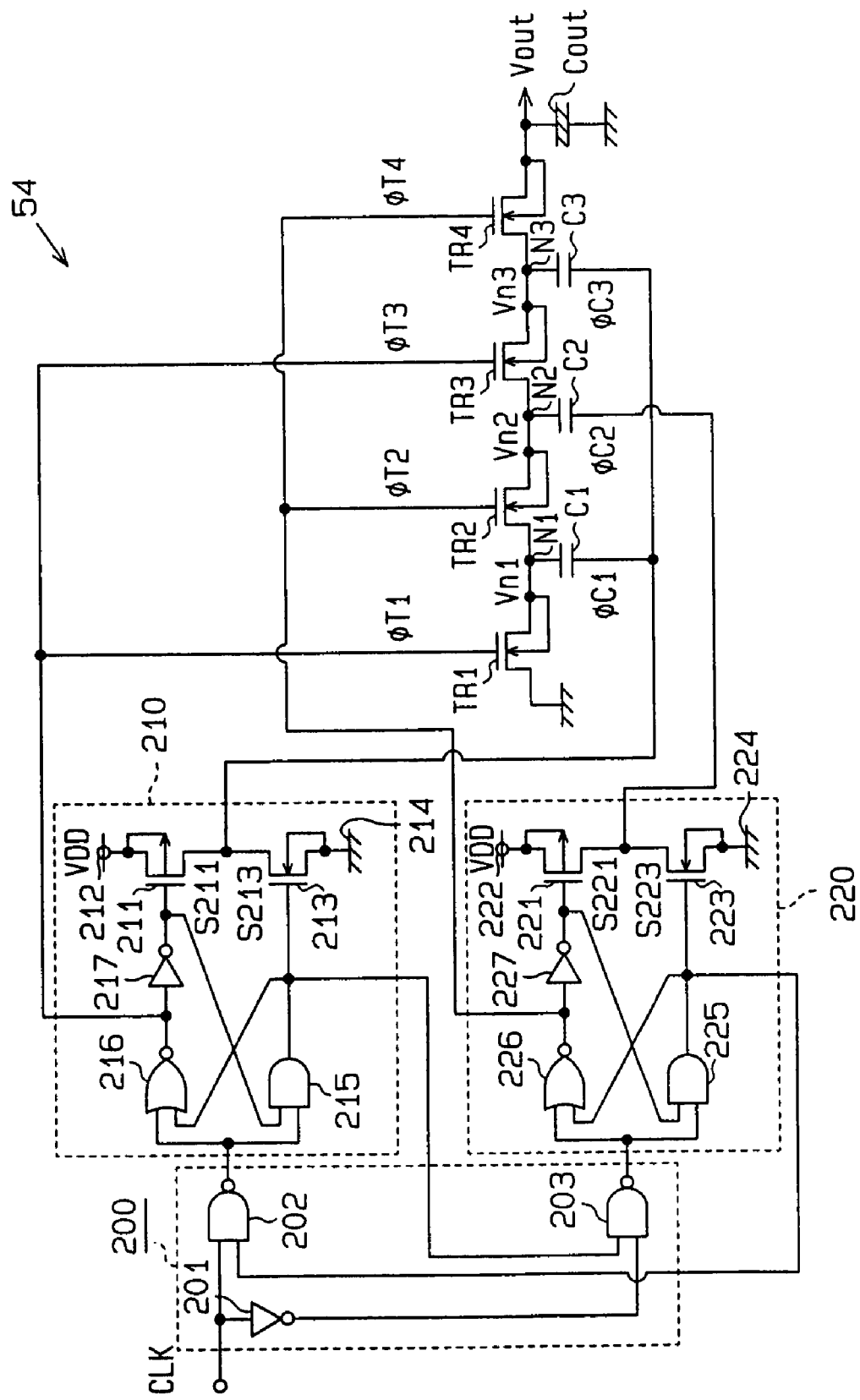
FIG. 10 is a schematic circuit diagram of a charge pump circuit according to a fourth embodiment of the present invention.

FIG. 10 is a schematic circuit diagram of the charge pump circuit 54 of the fourth embodiment. The charge pump circuit 54 includes four switching transistors TR1, TR2, TR3, TR4 and three capacitors C1, C2, C3 and converts the power supply voltage VDD to negative voltage −3VDD (logic value). The charge pump circuit 54 has a timing adjustment circuit 200 to prevent adjacent transistors TR1–TR4 from being simultaneously activated.

Further, the charge pump circuit 54 includes buffer circuits 210, 220 in lieu of the buffer circuits B1–B3 of the second embodiment to avoid the influence of a parasitic transistor.

The buffer circuits 210 generates control clock signals ØT1, ØT3 and delays the control clock signals ØT1, ØT3 by a predetermined time to generate capacitor clock signals ØC1, ØC3. The buffer circuits 220 generates control clock signals ØT2, ØT4 and delays the control clock signals ØT2, ØT4 by a predetermined time to generate capacitor clock signals ØC2, ØC4. The buffer circuits 210, 220 prevent the consumption of power between the capacitors C1–C3 and the ground.

Before the control clock signal received by the gates of the switching transistors TR1–TR4 goes high, the buffer circuits 210, 220 cause control signals S213, S223 to go low and deactivate transistors 213, 223 based on signals provided from the timing adjustment circuit 200.

The buffer circuits 210, 220 cause the control clock signals ØT1–ØT4 to go high based on the low control signals S213, S223 and provide the high control clock signals ØT1–ØT4 to the gates of the switching transistors TR1–TR4, respectively. The high control clock signals ØT1–ØT4 activate the transistors 211, 221. This supplies the capacitors C1–C3 with power supply voltage via high potential terminals 212, 222.

To obtain such functions, the buffer circuits 210, 220 include AND circuits 215, 225, NOR circuits 216, 226, and inverters 217, 227, respectively.

The timing adjustment circuit 200 generates clock signals to prevent two adjacent switching transistors TR1–TR4 from going on simultaneously and provides the clock signals to the buffer circuits 210, 220.

When the control clock signals ØT1, ØT3 go low, the timing adjustment circuit 200 provides the buffer circuit 220 with a clock signal so that the buffer circuit 220 generates the control clock signals ØT2, ØT4 at a high level based on the low control clock signals ØT1, ØT3.

When the control clock signals ØT2, ØT4 go low, the timing adjustment circuit 200 provides the buffer circuit 210 with a clock signal so that the buffer circuit 210 generates the control clock signals ØT1, ØT3 at a high level based on the low control clock signals ØT2, ØT4.

The timing adjustment circuit 200 includes an inverter 201, a first NAND circuit 202, and a second NAND circuit 203. The first NAND circuit 202 provides the buffer circuit 210 with a NAND logic signal based on the clock signal CLK and the signal received by the gate of the transistor 223 of the buffer circuit 220. The second NAND circuit 203 provides the buffer circuit 220 with a logical NAND signal based on the clock signal CLK, which is obtained via the inverter, and the signal received by the gate of the transistor 213 of the buffer circuit 210.

In the fourth embodiment, to ensure that the switching transistors TR1–TR4 go off, when the voltage at the sources of the transistors TR1–TR4 is negative, the negative voltage is set as the low voltage value of the control clock signals ØT1–ØT4.

Figure 11:
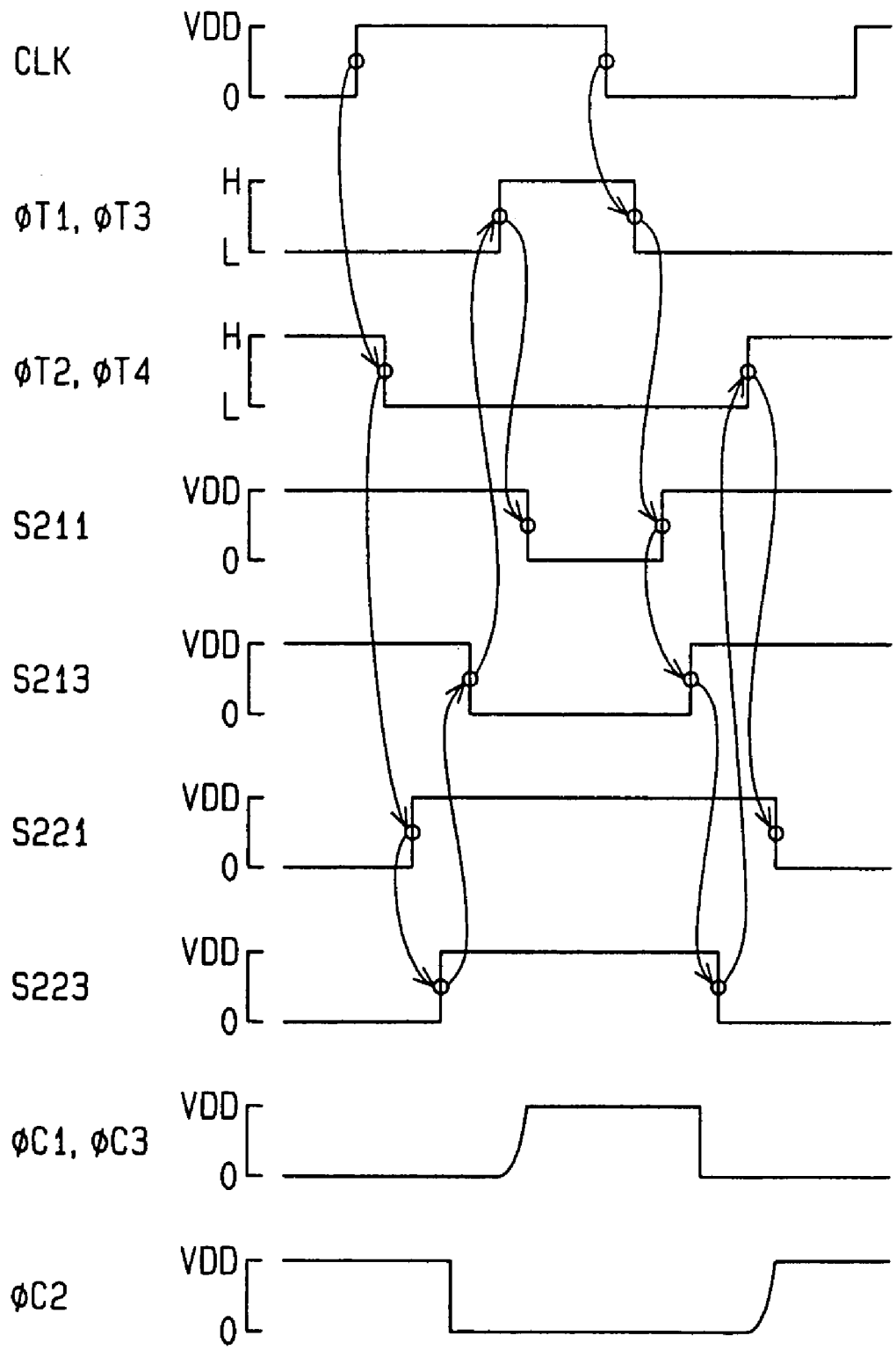
FIG. 11 is a combined timing and waveform diagram illustrating the operation of the charge pump circuit of FIG. 10.

FIG. 11 is a combined timing and waveform chart illustrating the operation of the charge pump circuit 54 of the fourth embodiment.

The charge pump circuit 54 of the fourth embodiment basically functions in the same manner as the charge pump circuit 53 of the third embodiment. The timing signals are generated so that power is not consumed between the capacitors C1–C3 and the ground terminals 214, 224 during the delay period from when the switching transistors TR1–TR4 go on to when the capacitor clocks ØC1–ØC3 go high.

After the transistors 211, 221 go off, the transistors 213, 223 go on. Thus, through current does not flow between the transistors 211, 221 and 213, 223.

It should be apparent to those skilled in the art that the present invention may be embodied in many other specific forms without departing from the spirit or scope of the invention. Particularly, it should be understood that the present invention may be embodied in the following forms.

The buffer circuits are not limited to the configurations illustrated in FIGS. 8 and 10. Especially, the combination of AND and NOR circuits may be changed as required. The buffer circuit may be provided with a first logic circuit and a second logic circuit. The first logic circuit receives an output signal of the second logic circuit and an input signal of the buffer circuit. Based on the received signals, the two logic circuits set the time period during which two transistors connected between two power sources are simultaneously deactivated and applies a predetermined potential to capacitors after the time period elapses. A buffer circuit having this function may be used.

The timing adjustment circuit adjusts the timing of clock signals to prevent inverted clock signals from simultaneously activating different switching transistors. Accordingly, a circuit having such function may be employed in the present invention, The switching transistors TR1–TR4 may be configured by p-channel MOS transistors. Alternatively, the switching transistors may be configured by n-channel and p-channel MOS transistors.

A charge pump circuit according to the present invention may perform various voltage conversions, such as step-up of the power supply voltage VDD or generation of a positive voltage with the negative voltage.

The number of switching transistors and the number of capacitors (pumping capacitors) is not limited and may be changed to obtain the desired output voltage.

The capacitor clock signals ØC1, ØC2 may be set at two different potentials like the clock signal applied to the conductive control terminals of the switching transistors. By changing the two potentials, the step-up capability of the change pump circuit is adjusted.

The present examples and embodiments are to be considered as illustrative and not restrictive, and the invention is not to be limited to the details given herein, but may be modified within the scope and equivalence of the appended claims.

What is claimed is:

1. A charge pump circuit comprising:
 a plurality of switching transistors connected in series between an output terminal and reference potential terminal of the charge pump circuit, where n the plurality of switching transistors includes a first transistor connected to the reference potential terminal and a second transistor connected to the first transistor, and wherein the first transistor has a control terminal provided with a first clock signal, and the second transistor has a control terminal provided with a second clock signal, the first and second clock signals having inverted phases;
 a capacitor connected to a node between the first and second transistors and having a first terminal and a second terminal;
 a delay circuit connected between the second terminal of the capacitor and the control terminal of the first transistor, wherein the delay circuit delays the first clock signal, which is provided to the control terminal of the first transistor, by a predetermined time and provides the delayed first clock signal to the second terminal of the capacitor such that the second transistor changes its state later than the timing at which the first transistor changes its state from an ON state to an OFF state; and
 a timing adjustment circuit for the first and second clock signals so that a during which the first and second transistors are simultaneously deactivated exists, wherein the timing adjustment circuit generates the second clock signal based on the delayed signal provided to the second terminal of the capacitor.

2. The charge pump circuit according to claim 1, further comprising:
 a buffer circuit functioning between a predetermined power supply potential and a potential at the node for receiving the first clock signal and providing a buffered clock signal to the delay circuit and the control terminal of the first transistor.

3. The charge pump circuit according to claim 1, wherein the timing adjustment circuit includes:
 a first inverter for receiving the delayed first clock signal, inverting the first clock signal, and generating an inverted first clock signal;
 a second inverter for inverting an original clock signal provided to the charge pump circuit and generating an inverted original clock signal;
 a first NAND circuit connect~d to the first and second inverters for receiving the inverted original clock signal and the inverted first clock signal 1 to generate the second clock signal;
 a third inverter for receiving the second clock signal and generating an inverted second clock signal; and
 a second NAND circuit connected to the third inverter for receiving the original clock signal and the inverted second clock signal to generate the first clock signal.

4. The charge pump circuit according to claim 1, wherein the timing adjustment circuit includes:
 a first NOR circuit for receiving an original clock signal provided to the charge pump circuit and the second clock signal to generate a first NOR logic signal;
 a first inverter connected to the first NOR circuit for inverting the first NOR logic signal and generating the first clock signal;
 a second inverter for inverting the original clock signal and generating an inverted original clock signal;
 a second NOR circuit connected to the second inverter for receiving the first clock signal and the inverted original clock signal to generate a second NOR logic signal; and
 a third inverter connected to the second NOR circuit for inverting the second NOR logic signal and generating the second clock signal.

5. The charge pump circuit according to claim 1, wherein the delay circuit temporarily sets the second terminal of the capacitor in a high impedance state and, after delaying the first clock signal by the predetermined time from when the first clock signal is inverted, provides the delayed first clock signal to the second terminal of the capacitor.

6. The charge pump circuit according to claim 5, wherein the delay circuit includes:
   third and fourth transistors connected in series between a high potential power supply and a low potential power supply, wherein a second node between the third and fourth transistors is connected to the second terminal of the capacitor;
   a first logic circuit for providing a first control signal to a control terminal of the third transistor; and
   a second logic circuit for providing a second control signal to a control terminal of the fourth transistor, wherein one of the first and second logic circuits generates its control signal based on the first clock signal and the control signal of the other one of the first and second logic circuits so that a period during which the third and fourth transistors are simultaneously deactivated exists.

7. The charge pump circuit according to claim 6, wherein the third transistor is a p-channel transistor connected between the high potential power supply and the second terminal of the capacitor, and the fourth transistor is an n-channel transistor connected between the low potential power supply and the second terminal of the capacitor, the first logic circuit being a NOR circuit, and the second logic circuit being an AND circuit, wherein the NOR circuit performs a NOR logic operation based on the first clock signal and the second control signal to generate a NOR logic signal, and the AND circuit performs a logic AND operation based on the first clock signal and the first control signal to generate the second control signal, and wherein the delay circuit further includes an inverter connected to the NOR circuit to invert the NOR logic signal and generate the first control signal.

8. The charge pump circuit according to claim 2, wherein the delay circuit temporarily sets the second terminal of the capacitor in a high impedance state and, after delaying the first clock signal by the predetermined time from when the first clock signal is inverted, provides the delayed first clock signal to the second terminal of the capacitor.

9. The charge pump circuit according to claim 8, wherein the delay circuit includes:
   third and fourth transistors connected in series between a high potential power supply and a low potential power supply, wherein a second node between the third and fourth transistors is connected to the second terminal of the capacitor;
   a first logic circuit for providing a first control signal to a control terminal of the third transistor; and
   a second logic circuit for providing a second control signal to a control terminal of the fourth transistor, wherein one of the first and second logic circuits generates its control signal based on the first clock signal and the control signal of the other one of the first and second logic circuits so that a period during which the third and fourth transistors are simultaneously deactivated exists.

10. The charge pump circuit according to claim 9, wherein the third transistor is a p-channel transistor connected between a high potential power supply and the second terminal of the capacitor, and the fourth transistor is an n-channel transistor connected between the low potential power supply and the second terminal of the capacitor, the first logic circuit being a NOR circuit, and the second logic circuit being an AND circuit, wherein the NOR circuit performs a NOR logic operation based on the first clock signal and the second control signal to generate a NOR logic signal, and the AND circuit performs a logic AND operation based on the first clock signal and the first control signal to generate the second control signal, and wherein the delay circuit further includes an inverter connected to the NOR circuit to invert the NOR logic signal and generate the first control signal.

* * * * *